United States Patent Office 3,496,123
Patented Feb. 17, 1970

3,496,123
METHOD FOR THE PRODUCTION OF HIGHLY POROUS OR FINELY CELLULAR POLYSTYRENE
Per Wolff and Svend Henning Kaaber, Farum, Denmark, assignors to Johns-Manville Corporation, New York, N.Y., a corporation of New York
No Drawing. Filed Nov. 2, 1964, Ser. No. 408,404
Claims priority, application Denmark, Nov. 8, 1963, 5,257/63
Int. Cl. C08f 1/11, 47/10; C08j 1/26
U.S. Cl. 260—2.5          5 Claims

ABSTRACT OF THE DISCLOSURE

This invention is a method for production of highly porous or finely cellular polystyrene in which polystrene is produced as globular coarse particles by polymerization in aqueous suspension in the presence of a stabilizing agent, a volatile liquid being incorporated in the particles while these are still in suspension, and finally, after the globules have been separated from water, expanding them by heating.

---

The present invention relates to a method for the production of highly porous or finely cellular polystyrene. More particularly, the invention relates to a method, in which the polystrene is produced as globular, coarse particles by polymerization in aqueous suspension in the presence of a stabilizing agent, a volatile liquid being incorporated in the particles while these are still in suspension, and finally, after the globules have been separated from the water, bringing them to expand by heating.

Hitherto great difficulties have been involved in keeping the styrene to be polymerized suspended during the polymerization process, and the present invention aims at solving this problem. The difficulties are due to the desire for producing fairly great globules by the polymerization, for instance globules of dimensions approximately between 1 mm. and 1 cm., since this facilitates the subsequent expansion. The stirring during the polymerization must, therefore, be performed with care, as there is a risk of a great part of the globules suddenly agglomerating to a cake which cannot again be brought into suspension.

It is known that the difficulties of maintaining a desired size of globules in the suspension is greatly varying as the polymerization proceeds, as in that respect the said process may be divided into three stages. In the first of these stages, when the viscosity of the solution formed by the polymerized and the unpolymerized styrene is still relatively low, a steady cutting up of greater suspended drops into small ones, and a steady fusion of smaller drops into greater ones takes place. Thereby a dynamic equilibrium is maintained as to drop size, and there is not yet any fear of the partly polymerized substance fusing to a compact mass.

On the other hand, the next stage, which in the technical literature is called the tacky state or the sticky state, and which will be called the range of stickiness in the following, is exceedingly critical because the viscosity has now gradually become so great that the larger globules or drops are only with difficulty divided into smaller, and at the same time the stickiness has increased the tendency of the globules for fusion. If quite special precautions are not taken at this stage to maintain the suspension, the whole of the sticky mass will quickly unite to a compact mass.

Hitherto it has been necessary therefore, to add more of the stabilizing agent, and this means that a steady control of the progress of the polymerization by exact measurements has to be carried out. A particular inconvenience in the use of a great proportion of dispersing agents is that the latter will often have a hampering effect during the expansion process. In the latter process it is normally desired that the globules should fuse while expanding as they become sticky during the heating, but this is made difficult if a layer of stabilizing agent has been left on the surface during the polymerization.

It has been noted that the stabilizing agent reacts with the monomer styrene, forming a graft polymer which adheres strongly to the surface of the globules.

At the stage where the globules are steadily being cut up and fusing again, the graft polymer will be intermixed into the globules, which will be detrimental to the physical properties of the resulting polymer. This is also a reason why it is desirable to be able to reduce the amount of stabilizing agent, or even to avoid using it.

Whereas, as mentioned, the first stage of the latter process is uncritical, and the next is strongly critical as regards maintaining the suspension, the third stage is again uncritical, since owing to the increase in the polymerization degree the stickiness has now become so low that the globules does no more shown any substantial tendency of fusing.

The critical range —the range of stickiness—normally lies between the polymerization degrees of 50 and 85% somewhat dependant upon the molecular weight distribution which is again determined by the polymerization temperature, the catalyst and other reaction conditions.

Addition of the volatile liquid which is to be incorporated in the globules to act later as a propellant for the expansion, has hitherto been carried out either before the start of the polymerization or immediately after the polymerization has been finished. In order to avoid that the said volatile liquid or propellant is dissolved in the water instead of being incorporated in the polystyrene, it is always chosen among substances which are substantially non-polar. Incidentally the propellant is normally added in amounts of between 5 and 15 percent by weight as calculated upon the polystyrene.

It is further known that volatile liquids having only a slightly swelling action upon polystyrene are best suited as propellants because liquids being quite without such swelling action cannot, in practise, be incorporated, and liquids having a substantial swelling action give a material of too coarse a cellular structure by the expansion.

It has been found that suitable liquids for use as propellants also have a pronounced effect as to stabilizing suspensions of partly polymerized styrene, that the said effect, however, only lasts for a relatively short time after the addition of the propellant. The explanation of this surprising effect seems to be that, owing to the slight swelling action upon polystyrene, the liquid serving as a propellant precipitates some of the polystyrene from its solution in the monomer, and that this precipitation takes place upon the surface of the suspended globules, whereby the stickiness is diminished so that the globules are less liable to fuse. However, the stickiness returns as the propellant penetrates deeper into the globules, resulting in the precipitated polystyrene upon the surface again dissolving in the monomer. Possibly, the above explanation only gives an approximate picture of the existing physico-chemical conditions, but in any case it has turned out that the said propellants are extraordinarily effective as stabilizing agents if added while the suspended globules are sticky. Finally it has been found that as stabilizing agents they are not so critical in action as regards dosage periods and amounts as are the commonly applied stabilizing or dispersing agents.

Thus it is possible, by using the propellant as a stabilizing agent, to do without the usual kind of stabilizing agents, or at least to substantially reduce the necessary amount, thereby escaping the disadvantage hereinbefore mentioned.

Accordingly, the present method is characterized in that the addition of the said volatile liquid is carried out long after the start of the polymerization and at a considerable period of time before its finish, substantially while the only partially polymerized styrene is in the range of stickiness.

A special advantage of this method is that a more uniform and substantially smaller size of cells is obtained than in the hitherto known methods.

The best results are obtained according to the invention, if the addition of the volatile non-polar liquid is performed continuously or in portions following quickly after one another, since the surface of the suspended, partly polymerized styrene drops is thus steadily kept moistened with the added liquid, while the polymerization proceeds through the range of stickiness.

According to the invention it is further expedient that the said volatile non-polar liquid is either an aliphatic or a cycloaliphatic hydrocarbon or a mixture of such substances, being selected with a boiling point or boiling point range substantially lying between 25 and 80° C., since liquids of this character are articles of trade and are cheap and easily available. Thus petrol ether is particularly suited for use in the present method, but also other mixtures of pentane and hexane as well as mixtures of cyclopentane and cyclohexane may be used.

According to the invention it is further advantageous to carry out a limited cooling of the suspension during the addition of the volatile non-polar liquid, because thus the control of the progress of the polymerization and the attainment of the desired size of globules becomes substantially easier.

In the following, the method of the invention will be further illustrated by examples.

EXAMPLE 1

A solution is prepared consisting of 275 kgs. of polystyrene waste dissolved in 925 kgs. of monomer styrene. The mixture has a viscosity of 320 cp. To this mixture are added 7.5 kgs. of benzoylperoxide. In a 4 m.$^3$ polymerization vessel, which is provided, for example with an effective stirrer, a jacket for heating and cooling, an inlet for the propellant and a liquid indicator, are introduced 2625 litres of water having dissolved therein 6.5 kgs. of a low-viscous strongly hydrolyzed polyvinyl alcohol of the type LEMOL-5-98 (Borden). The stirrer is started, and the water is heated to 78° C.

Now the polymer solution is pumped into the polymerization vessel while steadily stirring. The pumping takes 7 minutes, and the temperature in the vessel goes down to about 68° C. The resulting suspension is then heated to 80° C. and kept at the latter temperature. At the start, a relatively coarse and inhomogenous suspension of monomer drops in water is formed, but during the heating the drops become smaller, the maximum diameter being reduced to 0.4–0.5 millimeter.

In the following period, the size of the drops increases quite slowly. After 130 minutes, as calculated from the finish of the pumping of the monomer, the drops are in the range of stickiness, and it is observed that the size of the drops grows quickly. Some irregular drops or globular particles are formed, and the water between the drops becomes clearer because the fine drops of the monomer (about 1% of the total amount), which was formed at the start, now adhere to the larger drops or globules. If nothing were done at this stage, after a very short time the globules would become so great that they would rise to the surface and fuse to a solid mass.

Accordingly, addition of propellant, i.e. the volatile non-polar substance, is started before this occurs. As the propellant, a commercial available pentane and hexane containing hydrocrbon fraction is used, boiling below 55° C. During 40 minutes, a total of 18 litres of the said fraction are added in portions of 1–2 litres at a time.

This mode of addition results in the suspension remaining stable, the once obtained particle size remaining unchanged.

During the addition, the progress of the reaction is controlled by repeated measurements until the particles have a monomer content of 30%. At this point the major portion of the propellant is added. It is pumped into the vessel at a rate of 1.7 litres per minute. In order to get the bulk introduced while the particles are still swollen with the monomer, the suspension is simultaneously cooled to 65° C., whereby the polymerization rate is reduced. The cooling takes 25 minutes. Now a further 92 litres of the propellant are added during 54 minutes.

The mixture is heated again to 80° C., and the suspension is kept at this temperature for another 8 hours, whereafter it is cooled to 46° C., and the particles are separated from the water by centrifuging.

The resulting product consists of globular particles of the following distribution of the particle size:

| | Percent |
|---|---|
| Larger than 2 mms. | 1.0 |
| 2–1 mms. | 82.7 |
| 1–0.75 mms. | 9.0 |
| 0.75–0.5 mm. | 5.5 |
| Less than 0.5 mm. | 1.75 |

The monomer content is 0.18% as determined by titration with a solution of bromine.

The molecular weight is 98000 as determined by measuring the viscosity of a 10% solution in toluene.

By a steam treatment for 1½ minutes in an open vessel, a light-weight material is obtained consisting of individual cellular particles. The specific weight is 18 g. per litre, and the size of the individual cells in the particles is about 40$\mu$.

EXAMPLE 2

In the same manner as in Example 1 and using the same proportions, a polymer mixture, and a solution of polyvinyl alcohol serving as a stabilizing agent, are produced, however, using 7 kgs. of a highly viscous acid-hydrolyzed polyvinyl alcohol, which is commercially available under the trade name ELVANOL 72–60 (Du Pont) instead of the low-viscous polyvinyl alcohol of Example 1.

During the first hour it becomes apparent that the chosen stabilizing agent is not able to give a stable suspension. The drops grow quickly and 70 minutes after the start they have become so big that they rise to the surface and fuse together to an oleaginous viscous mass.

An increase of the stirring velocity is not able to bring about a re-suspending of the said mass, and an addition of a strongly acting stabilizing agent this early in the polymerization will result in the formation of very small globules.

Instead a slow addition of petrol ether is started. The petrol ether has the effect that parts of the polymer solution which are torn away from the main body during the stirring joins said main body again with difficulty, and the result is that the material becomes homogenously distributed in the water phase in the form of large lumps of 3–5 cms. diameter. This prevents the material from being wrapped about the stirrer shaft or settling upon the walls.

During 40 minutes a total of 25 litres of petrol ether are added. The monomer content is now about 43%, and the viscosity has become so great that a strongly acting stabilizing agent can now be used. Therefore, there are added 20 litres of a 7% aqueous solution of a medium hydrolyzed polyvinyl alcohol of medium viscosity, which is commercially available under the trade name POLYVIOL 25–140 (Wacker, Munich). At the same time, the reaction mixture is cooled to 65° C., and another 85 litres of petrol ether are pumped in. The polymerization is finished at 80° C. during 8 hours.

The resulting product appears as globular, slightly opaque particles.

The distribution of particle size is as follows:

| | Percent |
|---|---|
| More than 3.5 mms. | 7 |
| 2–3.5 mms. | 61 |
| 1–2 mms. | 24.5 |
| 1–0.75 mm. | 4.0 |
| 0.75–0.5 mm. | 2.75 |
| 0.5–0.25 mm. | 0.75 |
| Less than 0.25 mm. | 0 |

The product can be worked up as in Example 1.

EXAMPLE 3

In a 35 litre polymerization vessel of stainless steel, provided with a stirrer and the necessary inlets and a heating jacket, are placed 19 litres of distilled water, and the stirrer is started. The water is heated to 81° C., and dissolved air is removed by establishing a vacuum in the vessel, until the water has been boiling for 10 minutes. Then the vacuum is suspended, and the following mixture is added into the vessel:

| | Grams |
|---|---|
| Styrene monomer | 5480 |
| Polystyrene | 1760 |
| Benzoyl peroxide | 60 |

During the addition, the temperature in the vessel goes down to about 69° C., but is again increased to 81° C. and kept at this point during the polymerization.

By stirring, the styrene monomer becomes dispersed in the aqueous phase as globules of an average size of about 0.5 mm. diameter.

The globules grow during the polymerization, at first slowly, but after about 60 minutes fairly quickly. An addition of petrol ether of a boiling point of approximately 50° C. is now started, small portions being added so as to keep a small, steady but unmistakable surplus of petrol ether in the aqueous phase.

This makes the globules cease to grow, and the suspension becomes stable. A total of 700 millilitres of petrol ether is used, all of it being added during 150 minutes. The globules are at this point almost past the sticky state, but for the sake of security 20 millilitres of a 5% solution of a medium hydrolyzed polyvinyl alcohol are added.

After 10 hours, the suspension is cooled, and the globules are filtered off and washed. The yield is 7.3 kilograms of globular, slightly opaque particles of a diameter between 0.5 and 2.5 millimeters. The particles can be expanded in the usual manner by a steam treatment, forming blocks of polystyrene, wherein the individual particles are firmly fused.

What we claim is:

1. Method of producing finely cellular polystyrene of substantially uniform particle size by polymerization of styrene monomer in aqueous suspension comprising stabilizing the suspension of partly polymerized styrene while in the range of stickiness by diminishing globular growth through fuson and agglomeration of the tacky globular particles, said stabilization of the suspension of partly polymerized styrene by diminishing globular growth during the range of stickiness comprising introducing a volatile, non-polar liquid of only slightly swelling action upon polystyrene into the polymerization mixture during the period beginning at the stage which the partially polymerized styrene is in the state of stickiness and the tacky globular particles grow through fusion and agglomeration but prior to the stage at which the polymerization proceeds to the degree that the globular particles show substantially no further tendency to fuse and agglomerate, to diminish such growth during this period.

2. The method of claim 1, in which the volatile, non-polar liquid is added continuously to the suspension, while the partially polymerized styrene is in a state of stickiness.

3. The method of claim 1, in which the volatile, non-polar liquid is added in quickly successive steps to the suspension, while the partly polymerized styrene is in a state of stickiness.

4. Method according to claim 1, in which the volatile, non-polar liquid is a member of the group consisting of aliphatic hydrocarbons, cycloaliphatic hydrocarbons, and mixtures of said hydrocarbons, boiling within the range of 25 to 80° C. at atmospheric pressure.

5. Method according to claim 1, in which a slowing down of the polymerization rate is effected by a limited cooling of the suspension during the addition of the volatile, non-polar liquid.

References Cited

UNITED STATES PATENTS

| 3,192,169 | 6/1965 | Doak. | |
| 3,259,594 | 7/1966 | Wright | 260—2.5 |

MURRAY TILLMAN, Primary Examiner

W. J. BRIGGS, Sr., Assistant Examiner

U.S. Cl. X.R.

260—29.6, 33.6, 93.5